United States Patent [19]

Grushow

[11] 4,207,770

[45] Jun. 17, 1980

[54] CHANGE OF DIRECTION SENSING MECHANISM

[76] Inventor: Gerald Grushow, 14 Dartmouth Dr., Plainview, N.Y. 11803

[21] Appl. No.: 36,864

[22] Filed: May 7, 1979

[51] Int. Cl.$^2$ ............................................. G01P 15/00
[52] U.S. Cl. ............................ 73/517 R; 200/61.39; 200/153 N
[58] Field of Search .................. 73/432 A, 517 R; 200/61.39, 19 M, 61.13, 61.15, 61.17, 153 N

[56] References Cited

U.S. PATENT DOCUMENTS

| | | | |
|---|---|---|---|
| 3,060,370 | 10/1962 | Varterasian | 73/517 R UX |
| 3,622,722 | 11/1971 | Jackson et al. | 200/61.39 |
| 3,731,542 | 5/1973 | Forsberg | 73/516 R |
| 3,780,440 | 12/1973 | Taylor | 33/139 |
| 3,791,037 | 2/1974 | DiCiaccio et al. | 33/125 R |
| 3,832,783 | 9/1974 | Schreier | 33/138 |
| 3,913,405 | 10/1975 | Ljung et al. | 73/505 |
| 3,924,474 | 12/1975 | Friedland et al. | 73/505 |
| 3,936,943 | 2/1976 | Bullard | 33/125 R |
| 3,992,952 | 11/1976 | Hutton et al. | 73/505 |
| 4,050,000 | 9/1977 | Sutter | 200/61.39 X |
| 4,051,718 | 10/1977 | Meckl et al. | |
| 4,057,904 | 11/1977 | Vrabel et al. | 33/125 R |
| 4,083,255 | 4/1978 | McKechnie | 73/655 |

Primary Examiner—Jerry W. Myracle

[57] ABSTRACT

In a preferred embodiment, a device incorporating a change-of-direction slip-clutch magnet unit monitors movement in a changed-direction within a range as small as 0.005 inch responsive to a force of a magnitude as small as an ounce, and the change of direction may be of any of varying direction to be detected. The magnetic unit includes a magnet movable within a small limited range of distance within a window of a support structure, while the magnet is magnetically mounted on a metal rotary disk with a disk of nylon or Teflon mounted permanently and immovably onto the slidable base surface of the magnet which base is magnetically attached to the side face of the rotary disk and slidable on that side face when the magnet is restricted from further movement and the rotary disk concurrently continues to move, such that movement of the magnet from its initial position to its restricted movement imparts magnetic flux to an adjacent reed switch mounted on the support structure to open or close electrical contacts of the reed switch to thereby transmit or break electrical signal to some functional electrical circuitry such as one embodying an alarm or a counter or a memory bank, inverter, one-shot element, gate-control of a gate transistor, or the like.

28 Claims, 19 Drawing Figures

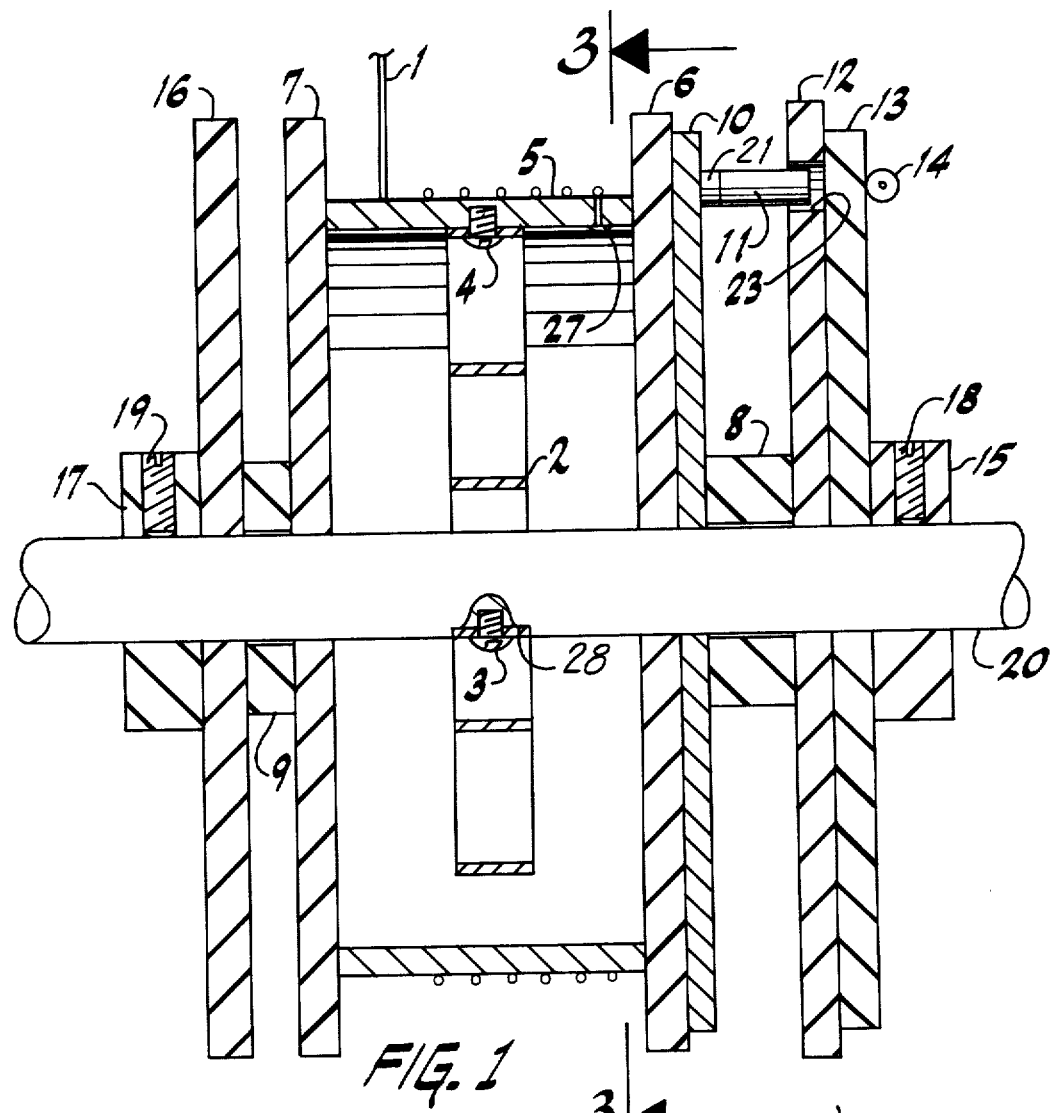
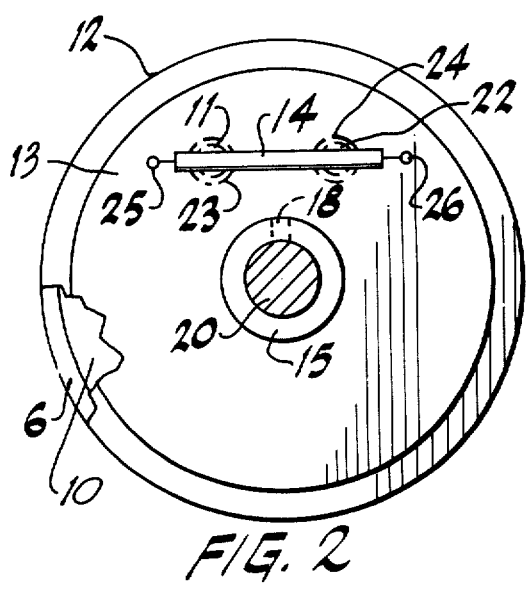
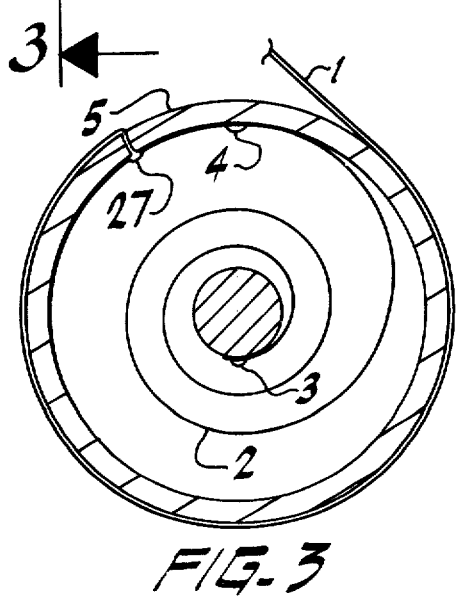
FIG. 1
FIG. 2
FIG. 3

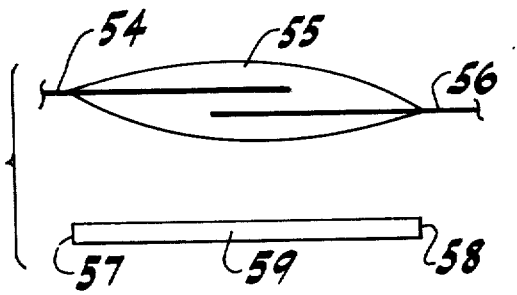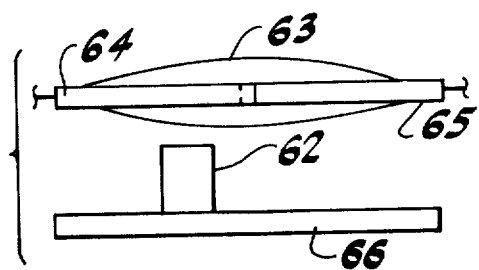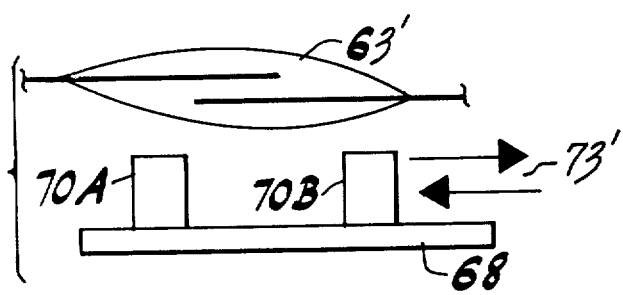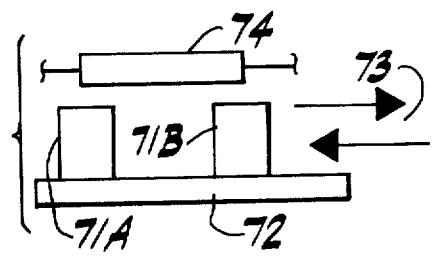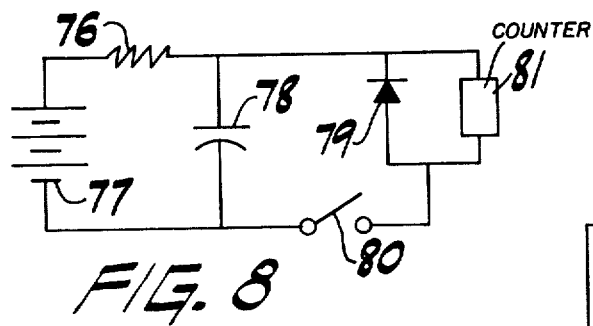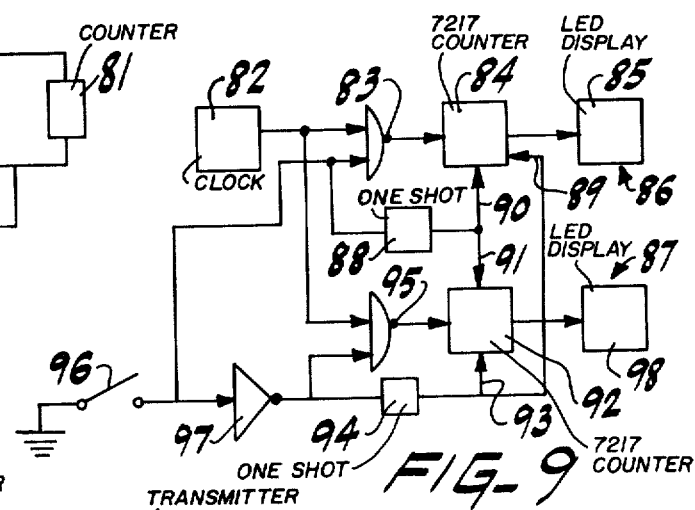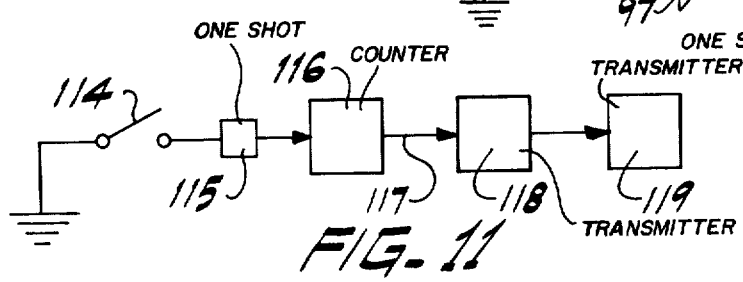

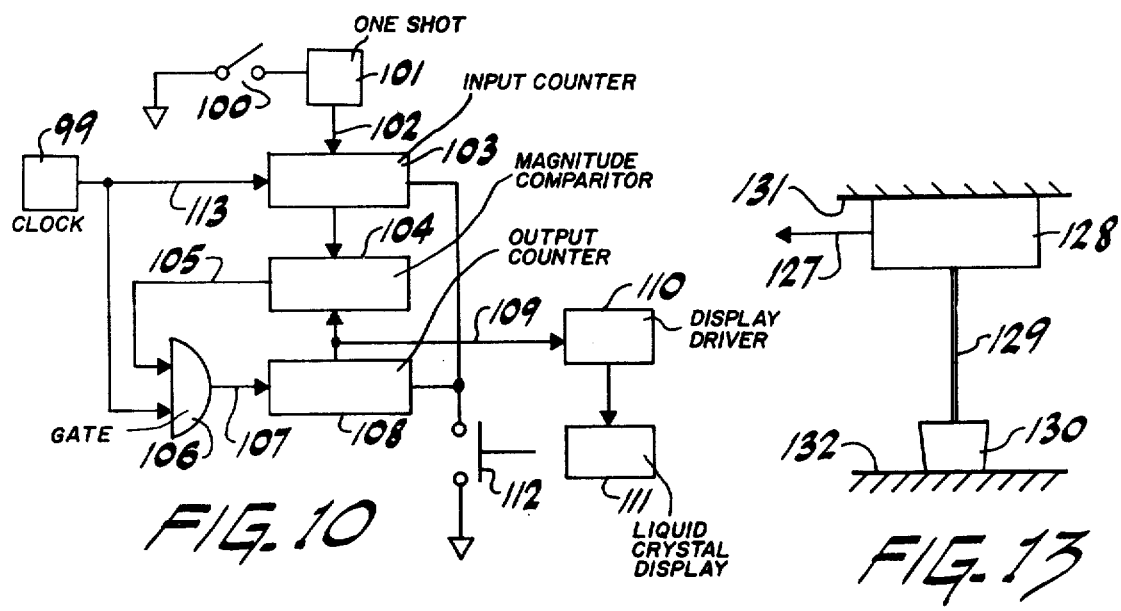
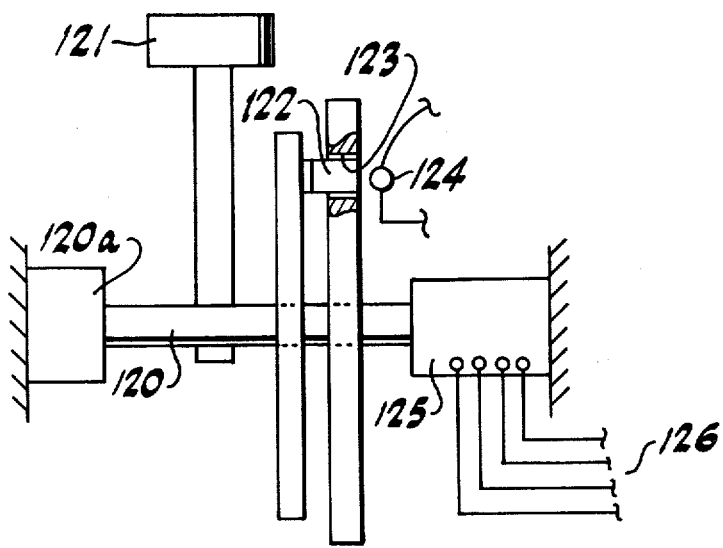
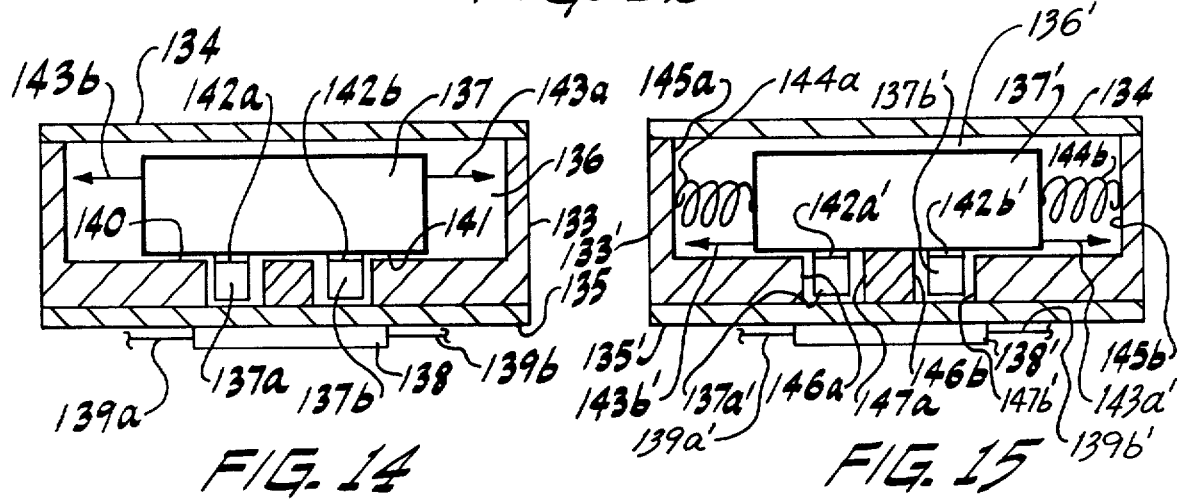

CHANGE OF DIRECTION SENSING MECHANISM

This invention is directed to a novel low-cost device and novel principle for detecting change of direction, and embodiments thereof.

BACKGROUND OF THE INVENTION

An extensive search of patents, textbooks, and technical journals has revealed that there is no device nor suggestion of such, that utilizes a slip-clutch principle nor magnetic slip-clutch nor which measures change of direction of an object moving in non-linear and/or arbitrary varying manner. Such motions may be of an object moving in a nonlinear, slow movement such as the breathing of a child over a long period of time, or of ocean waves, or winds. In electronics, peak and crossover detectors can measure sinusoidal and some bounded waves. However, in general they cannot follow an arbitrary waveshape. In the physical domain, there can be thousands of applications of such a detector not heretofore available. Such detector, together in combination with conventional electronic existing prior art, can be readily utilized to monitor the breathing of a small child for example. Heretofore, breathing measuring methods outside of a closed incubator include radar and sonar techniques, and restrictive belt resistance sensors, and methods in which the patient is wired to a machine. Sound sensors are also being studied. However, there is no safe nor accurate, low cost device nor method which heretofore could measure a child or adult in his breathing without disturbing him or exerting significant force on him. No device could be placed on a sleeping child who is under a blanket and in a second could give an accurate measurement of events of breathing.

U.S. Pat. No. 4,057,904 by Vrabel discloses the sole device which measures a similar type of motion; however, it measures distances and exerts large forces and operates over a large hysteresis loop, of large magnitudes. It is designed for a large differential in X and a variable L, and measures the variation of distance between freight cars. It is a rugged, heavy-duty device, and there is no way a miniature version thereof could pick-up differentials of X anywhere approaching as small as 0.005 inch nor at any force that might approach as small as or less than an ounce. It additionally could not survive service of anywhere near 50 million operations. Not even with aerospace technology and anti-backlash gearing could this patent's device be considered a delicate measuring instrument.

For use in delicate measurements, a direction change detector must operate with a very small window (in minimum range) of detection-sensitivity, in order to accurately switch on the occurrances of the instantaneous peaks. However, a slight hysteresis is required for stability. Actually, the above-noted Vrabel's patented device is the exact "opposite" to that of the present invention of this application; Vrabel's device works mostly in the linear region, and rarely slips on its clutch, whereas, the present inventive direction sensor—as shall be later described, constantly slips on its clutch-mechanism as a critically required part thereof permitting movement over a large range of a movement the direction of which is being detected as a movement.

Another patent that merely superficially resembles one of the embodiments of the present invention, to be later described, is the accelerometer of Forsberg U.S. Pat. No. 3,731,542.

SUMMARY OF THE INVENTION

Accordingly, objects of the invention include the overcoming and avoiding of difficulties and disadvantages and inabilities of prior art.

Another object is to provide a sensor device that improves and makes more accurate breathing measurement for home and/or hospital and thereby will save lives and will provide basis for further research.

Another object is to provide a sensor device to improve the handling capabilities of aircraft.

Another object is to provide a device which has thousands of applications useful to man, and that often can be built economically for as little as one dollar, for example.

Another object is to obtain a unit utilizing a reed switch with improved reliable detection within 0.005 inch, together with a possible axial distance of magnet(s) from the reed switch up to ¼ inch.

Another object is to obtain an embodiment that sounds an alarm if a person stops breathing for a predetermined maximum period of time.

Another object is to obtain an embodiment that measures sleep apnea, the maximum inhale and/or exhale time over a period of hours.

Another object is to obtain an embodiment that measures either or both exhale and inhale times.

Another object is to obtain an embodiment that mounts total breaths over a period of time.

Other objects become apparent from the preceding and following disclosure.

One or more objects of the invention are obtained by the invention which is merely typically and diagrammatically represented by the illustrated embodiments of the following Figures and description thereof, such not being intended to unduly limit the scope of the invention but merely to enhance understanding of the controlling features and typical embodiments thereof.

Broadly the invention may be described as a direction sensor device having at least a first magnet with the magnet's movement being limited within a minor range within space between limiting support structure barriers, with the movement between those barriers being substantially linear (with a possibility of some arced curvature in movement) as moved by a movable driving mass to which it is magnetically attached. As the movable driving mass moves a distance beyond the minor range of the magnet's movement, the further limiting of movement of the magnet by the limiting support structure barrier causes the base of the magnet to slide over the face of the side of the movable driving mass. Because the magnet's movement has been limited within the effective range over which magnetic flux or other switch-initiating mechanism may immediately function, the first alternate direction movement of the movable driving mass is instantaneously detected. In one embodiment, the magnet itself upon contact with the limiting barrier transmits electrical signal through the magnet to the barrier contact, and in an embodiment where the opposite barrier is also an electrical contact, the magnet serves as a flip-flop switch. In a more preferred embodiment, a conventionally known and available reed switch (which opens and closes contacts thereof by response to magnetic flux variations) is mounted on the support structure in operative proximity of the magnet and its path of limited movement. In a further preferred embodiment, a plurality of magnets are utilized, thereby increasing the minimum range of movement for the magnets and as well making the reed switch more promptly responsive to minimal and initial movements of the magnets. In another preferred embodiment, multiple units, spaced-apart from one-another, of the combinations of magnets and reed switches, with all magnets mounted commonly on the same movable mass but for example on different (adjacent different) circumscribing edges of an annular disk serving as the movable mass. Preferred combination include the annular disk feature as the movable mass such that rotational movement thereof is measured by the moving magnet, and such embodiment preferably including an elongated connector such as a string tied-down at its end or weighted, or the like, whereby jerks on the string, or linear movement otherwise thereof causes the annular disk-movable mass to rotate and to move the magnet which movement is detected by the reed switch. In a further preferred embodiment, the initial change-of-pivotal movement-direction of a handle of an airplane resolver is detected in the earliest-possible phase of movement in change-of-direction movement for an early feed to the computer to hopefully maximize pilot response and reaction time to thereby avoid dangerous and possibly fatal delays in execution by the speeding airplane or rocket. Other preferred embodiments include burglar alarms upon detection of movement of a window, door or the like, or movement of a body against the connector, and include wave-movement detectors and basement-flood alarms, and sump-pump actuators, and the like. In a still further preferred embodiment, an embodiment for detecting on an inexpensive basis, of change in direction and/or momentum by initeria is particularly valuable for use in artillary projectiles, rockets, airplanes, submarines, torpedoes, and the like.

The present inventive direction sensor is a device which to a high degree of accuracy detects and may indicate the exact point and/or time and/or frequency that an object has changed its direction, and the change in direction may be in the same or different plane or arc, or other geometrics. This detection occurs just after the point that the velocity in the prior direction has reached zero, upon first movement across and beyond the zero point. The direction sensor requires an additional distance (across and beyond zero) of less than 0.005 inches and a force of less than an ounce, remarkable achievements in the art of detection of such motion. A slip-clutch mechanism is provided so that it will work with any type of motion while concurrently the present sensor elements function within fixed small spacial boundaries. This boundary distance is important in situations where objects may firstly move back and forth over small distances and then expand or contract and secondly move back and forth at a second location spaced some great distance away from the original point of the first movement, such as for example in the measurement (detection) of wave movement and frequency, etc.. Such motion may typically be the height of water at a particular point in an ocean, or it may be a person breathing, or it may be a pilot moving a control lever handle in varying directions in his efforts to promptly and speedily stabilize a plane's or rocket's composit-motions, one or more.

This invention works in either or both a linear and non-linear direction(s) and ranges, and therefore is a novel control element with wide varities and functions and purposes.

THE FIGURES

FIG. 1 is a schematic cross-section illustration of a sign of velocity transducer direction-sensor device in accord with the present invention.

FIG. 2 is a partial cut-away and plan view of the support structure stationary surface of the FIG. 1 embodiment, showing the positioning of the windows and the magnets within the windows relative to the reed switch.

FIG. 3 is a cross-sectional view along lines 3—3 of the FIG. 1, illustrating the bobbin and biasing coil spring thereof.

Figure 4:
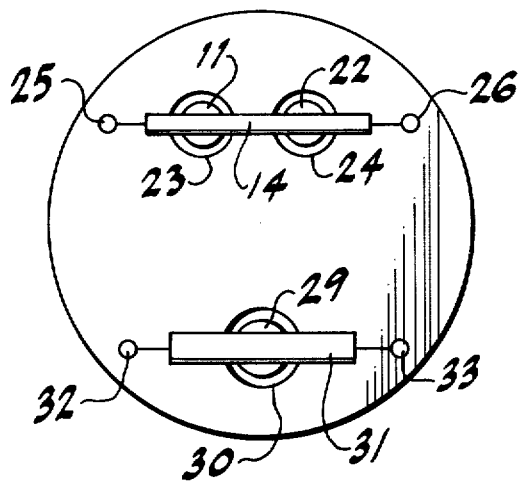

FIG. 4 symbolically illustrates an alternate embodiment in a view comparable to that of FIG. 2.

Figure 5:
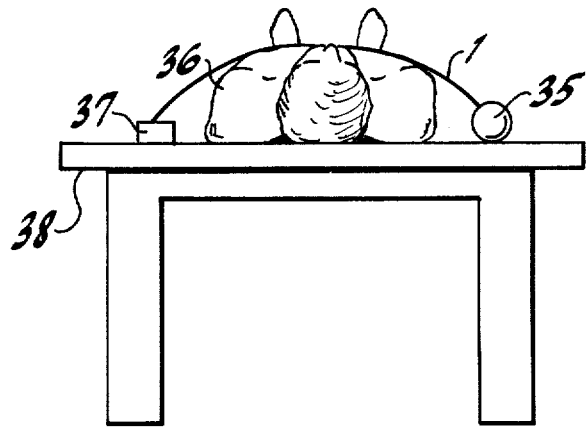

FIG. 5 shows a typical table-end view of a person having a breathing-detection sensor device strung-across his chest, looking toward the top of this head.

Figure 6A:
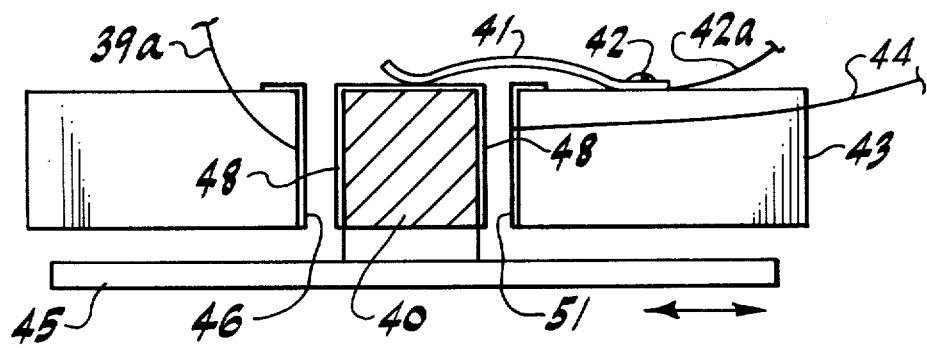

FIG. 6A illustrates a mechanical electrical contact-switch of a flip-flop variety, embodying the inventive slip-clutch magnet of the present invention, in a side diagrammatic view thereof.

Figure 6B:
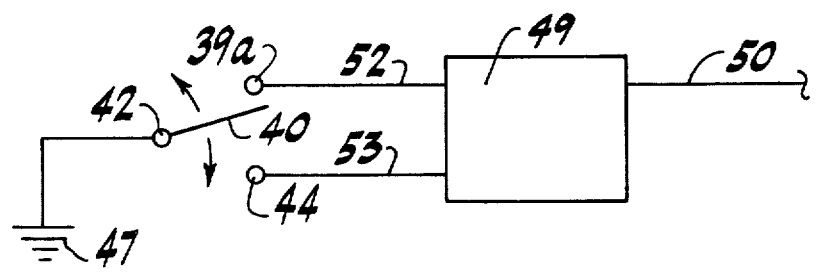

FIG. 6B illustrates a typical diagrammatic circuitry embodying the FIG. 6 embodiment.

FIGS. 7A through 7D illustrate diagrammatically alternate reed switch variations in type which are utilizable with the slip-clutch magnet of the present invention, in side views thereof, these variations resulting in improved and enhanced switching distances, particularly in the preferred use of two magnets. It is noted that if too strong a magnet or if multiple magnets were merely randomly arranged, often the reed switch becomes inoperatively locked open or lock closed.

FIG. 8 illustrates a typical and preferred circuitry embodying the present invention, for measurement of total counts.

FIG. 9 illustrates a typical and preferred circuitry embodying the present invention for measurement of on and off times.

FIG. 10 illustrates a typical and preferred circuitry embodying the present invention for providing maximum time between events being measured.

FIG. 11 embodiment of the invention for sounding an alarm if there terminates the series of prior repeated opening and closing of the reed switch, with the disclosed circuitry.

FIG. 12 embodiment diagrammatically illustrates an aircraft resolver handle embodiment of the invention.

FIG. 13 embodiment diagrammatically illustrates an alarm device for detecting variations in water-level, embodying the invention.

FIG. 14 diagrammatically illustrates an inertia embodiment embodying the present invention, shown in partion side cross-sectional view.

FIG. 15 illustrates an embodiment and view substantially the same as FIG. 14, but with additional features and utility.

DETAILED DESCRIPTION OF THE INVENTION AND FIGURES

Referring to FIG. 1, a cord 1 is wound around a bobbin consisting of cylinder 5 and circular plates 6 and 7 which are fastened with typically epoxy or screws. Through the center of the bobbin is a shaft 20. A constant tension flat wound coil spring 2 is fastened to the bobbin by rivet 4 and to the shaft by rivet 3. For 0.0055 inch accuracy, a bobbin of acryllic plastic and a stainless steel shaft is satisfactory. Greater accuracy and life requires stainless steel bearings to be inserted between the shaft and the bobbin. A minute force causes the bobbin to rotate around the shaft Since the spring is in the center of the bobbin twisting forces on the bobbin are eliminated and the pull on the cord equals the force of the spring. This method insures that the device does not get stuck and that it always returns an amount equal to the displacement. Of course the device is used where there is always some spring tension.

Attached to one face of the bobbin is a magnetic steel annular disk 10 with a smooth coating such as tin on its flat face. For circular motion, this disk could have been attached directly to a rotary shaft which is to be monitored. Washers 8 and 9 separate the bobbin assembly from the rigidly supported support disks 16 and 12. These disks are fastened to the case or are part of the case. A slight axial play of the bobbin exists so as to avoid binding. A few thousanths of an inch is normally satisfactory for axial play.

Fastened to the end support disks are threaded shoulder supports 15 and 17 with setscrews 18 and 19. These insure perpendicularity of parts and also lock the shaft rigidly.

Magnet 11 is fastened to slide clutch-disk 21 which is typically a nylon or teflon washer. This assembly is held on steel plate 10 by magnetic attraction of magnet 11. This magnetic assembly moves with the steel plate freely due to its magnetic attraction. Plate 12 has a hole 23 (window opening) in it which is a few thousandths of an inch larger than the preferably round magnet, thus limiting the magnets motion within the hole to a few thousandths of an inch.

When the cord is pulled, the force required equals the pull of the spring plus the friction of the bobbin with the shaft plus the friction of the magnetic assembly against the steel plate. When the cord is released, the spring must overcome the friction of the bobbin against the shaft and the friction of the magnetic assembly against the steel plate as it slips—as a slip-clutch. The above construction is such that these forces are negligible. This insures that the spring can be very soft.

Plate 13 is cemented to plate 12 after the reed switch 14 has been calibrated. This is necessary since for a precision of 0.005 inch, careful positioning of the reed is required. Reed 14 is fastened to plate 13 by epoxy and also by electrical standoff terminals which are not shown. Plate 13 may be molded to the shape of the reed if desired. The same construction would be used if a hall effect switching transistor by Sprague Co. were used. The Hall effect transistor is basically a solid state reed switch.

The characteristics of this assembly is that the cord can be pulled large distances while the magnet moves only a few thousandths of an inch. When traveling in one direction, the slightest opposite motion causes the reed to change state. If the reed was closed, it would switch open, or visa versa, or a single pole double throw reed would switch between contacts. This switching point occurs when the velocity crosses zero and thus the direction is detected as a change in direction.

A short coming of a one magnet system is that axial tolerances along the shaft cause the switching point to change. The hole in plate 12 must be made larger thereby reducing the sensitivity. This problem is overcome by using a two magnet system, one near the center of the reed and another at either end. The result is that switching can occur in 0.005 inches with axial movement up to ¼ inch. This discovery is a state of the art advancement which the industry is not aware of. Many models of these sensors have been built and stronger magnets than recommended by the manufacturer have been used. The discovered trick is to obtain a strong gradient magnetic field. The magnets are installed in bucking positions, to create a strong gradient magnetic field.

In order to measure two simultaneous waves, the assembly would be built with two reeds. The first would switch at the 0.005 inch tolerance and the second reed would switch at a suitable larger tolerance. In other applications, we may want to measure the larger lower frequency oscillation and ignore the smaller higher frequency one. In this case, the magnet's window or hysteresis loop would be made larger.

Referring to FIG. 2, magnet 11 moves freely in window opening (hole) 23 of plate 12. A second magnet 22 is shown and moves freely in window opening 24 of plate 12. Plate 13 covers plate 12 and keeps the magnets locked in position axially. There is some axial tolerance and heavy shock could lift the magnets off steel plate 10; however, the magnetic attraction will restore the surface contact immediately. Plate 13 also protects the reed from the magnet in case of shock and also prevents the magnet from getting stuck to the reed.

Reed 14 is epoxied to the plate and also held by terminals 25 and 26. For a single magnet version, magnet 11 is placed near the center of the reed. For the two magnet version magnet 11 is placed near the center of the reed and magnet 23 is placed toward one end. The magnets are of opposite polarity facing the reed. This switches the reed rapidly and also reduces the very slight attraction between magnets and reed. The resulting axial forces are very slight and this is important because they act like a cars disk brakes and necessitate a heavier spring for operation.

In FIG. 2, in place of the reed switch one could use the Hall effect transistors. Since magnet and double magnet versions are also possible here, the double magnet producing the large gradients for short switching distances.

Referring to FIG. 3, this figure shows the details of the inside of the bobbin. Cord 1 is placed through cylinder 5 knotted and epoxied in slot 27. Spring 2 is rivited to cylinder 5 by rivet 4 and to shaft 20 by rivet 3. Shaft 20 has a grove 28 cut in it to accomodate the spring. This construction completely seals the spring in the bobbin and thus the spring will never fly apart like a standard tape measure when the case is opened.

Referring to the FIG. 4, this figure discloses a second reed 31 placed on plate 13. Magnet 29 moves in slot 30 which is much larger than slots 23 or 24. The output from reed 31 will pick up the higher amplitude lower frequency vibrations.

Referring to FIG. 5, this figure shows one way the transducer is used to monitor the breathing of a patient 36 on a bed 38. Transducer (direction sensor) with case 35 is placed on one side of the patient. Cord 1 is extended and placed around the patient and held down by weight 37. Another method would be to suspend the transducer from a stand and pull the cord down and attach to the patient by a suitably shaped weight or tape. This method would be ideal for hospital emergency rooms where monitoring would be for a short time and the stand could be rolled quickly to the patient.

FIGS. 6A and 6B disclose an apparatus and circuitry illustrative thereof, where the sensor mechanism consists of a special switch where the magnet is an integral part thereof, of a flip-flop nature. The magnet is coated with or covered with a suitable conductive material such as gold, and will carry a low voltage and low current of such an electronic conventional circuit.

FIGS. 6A and 6B further show a magnet 40 which moves in a slot or window 48 as it follows the moving manetic surface of the movable mass 45. At the extremes of the window are two contacts 39a and 44. These contacts are rigidly part of the stationary surface of the support structure and are coated with gold 46 and 51, noting the support structure 43. Note rivet 42, and lead 42a. The entire motion of the magnet is limited to a few thousandths of an inch. A center contact 41 of springy material and gold plated is riveted to the stationary surface and makes contact with the magnet 40 by spring action or slight magnetic attraction or both.

FIGS. 6A and 6B shows contact 39a of set-position 52 of standard flip flop 49 such as a JK or D type. Contact 44 is wired to the reset contact terminal 53, and the center arm 42 is wired to ground. When the magnet 40 touches the contact 39a slightly, it sets the flip flop 49 and output 50 goes high. When it touches neither contact, the flip flop does not change state. When the magnet touches contact 51 slightly, the flip flop resets and output 50 goes low.

By using standard high precision machine techniques, it is possible to limit the motion to only 0.001 inch. In this case the electric field would be very strong if we used five volt logic circuits. If we used a standard low voltage comparitor, the same flip flop action could be produced with the voltage across the contacts limited to a few milivolts.

Explanation of improvements in switching distances obtained during the building of several direction sensors is illustrated in FIGS. 7A through 7D.

FIG. 7A shows a typical miniature reed switch such as Standax Electronics Co. Model GS125. And a bar magnet 59 having North pole 57 and South pole 58, such as of 60 Gauss strength supplied by Standax Co.. Motions toward and away from the reed switch in glass seal 55, having leaf 54 and leaf 56, will switch from on to off with a total distance of 0.020 inches, while sideways motion requires 0.030 inches. These are typical distances for many of the inexpensive and expensive reeds tested. This is not good enough for the most sensitive applications of the direction sensor.

In FIG. 7B, by using a high quality bar magnet 62 of 1000 Gauss strength from Indiana General Co. and by turning the reed switch in glass seal 63 so that the leafs 64 and 65 are perpendicular to the face of the magnet 62 to prevent excessive deflection of the leaves, a distance of 0.005 inches has been obtained for the total swing from on to off to on again. This technique requires that the magnet 62 remain a fairly constant distance from the surface of the reed. The problem is that the reed which consists of two springy leaves of magnetic material encased in a nitrogen filled glass seal, requires a strong change in magnetic field intensity to switch. In a normal magnet, the field radiates smoothly through the surrounding space. By using pieces of magnetic material such as iron, one can modify the field to various configurations. The easiest method of producing a strong gradient magnetic field is to use two magnets in a bucking configuration. One can be stationary and the other one can move, or both can move.

FIG. 7C shows two magnets 70A and 70B typically each of 200 Gauss strength, moving along the magnetic surface 68. Halfway between the magnets, the field is zero, and on either side of the null (zero) point the magnetic field strength varies much more rapidly with distance than for a single magnet. Thus, this differential magnetic assembly is much superior than a single magnet. Switching distances of 0.005 inch are easily obtained, and furthermore the magnets may be moved away from the reed by as much as ¼ inch without a change in the switching point. This is important since the mechanical assembly could be made with very loose tolerances and the assembly will-still work perfectly.

FIG. 7D shows a similar configuration using two magnets 71A and 71B and a Hall switching transistor 74 and directions 73 of motion along magnetic surface 72. Whereas, the reed switch does not care which polarity—North or South field switches it, the Hall transistor requires a magnetic field of South polarity perpendiculr to its face. For one magnet, switching distances of 0.020 were obtained, but two bucking magnet obtained (with two 1000 Gauss magnets) distances of 0.005. The Hall transistor 74 is basically a solid state reed relay and can be used in all the embodiments and applications shown or discussed in this disclosure.

Actually, distances smaller than could be measured were obtained using the bucking magnets. However, these depended on the magnets being kept at a fixed distance from the reed switch. If precision machining and placement of parts is provided, then 0.001 inch should be obtainable. However, the 0.005 is a factor of four improvement in the state of the art and should suffice for most application of the present invention. It is also interesting to note that the first sensors built a year ago have not deteriorated in their performance, these being experimental models of the inventor.

FIG. 8 discloses circuitry for measurement of total counts of changes of direction, containing electronics to provide a count of the number of opening and closing cycles or events, including battery 77; diode 79, electromechanical counter 81, etc..

The capacitor 78 slowly charges via the resistor 76 when the reed switch 80 is open. When the reed switch closes, the electromechanical counter 81 is energized and advances one count. When the reed switch 80 opens again, current through the counter goes through the diode 79 and dissapears. This prevents arcing damage to the reed switch 80. If a standard electronic counter 81 with LED display is used, only the reed switch is required. This system will continue to count until the direction sensor stops. At that time the counter can be reset to zero by a conventional built-in reset mechanism thereof.

FIG. 9 illustrates a device for measurement of on and off times. In FIG. 9, the clock 82 can be set to produce 100 pulses per minute. When the reed switch 96 is closed, gate 83 will be disabled and gate 95 will be enabled via the inverter 97. Clock pulses will pass through gate 95 and be counted by the 7217 counter 92 When the reed switch 96 opens, one shot 94 will produce a pulse to store terminal 93. The data in the memory register of the 7217 counter 92 is thus stored. This pulse will also clear the counter 84 in the 7217 counter 84. The 7217 counters have built-in electronics to directly drive LED neumeric displays 85 and 98. When the reed switch 96 is opened, gate 83 is enabled while the inverter 97 is disabling of gate 95. Thus the 7217 counter 84 counts. Upon the closing of the reed switch 96, one shot 88 stores the data in the first 7217 counter 84, and resets the counter in the second 7217 counter 92. Since the 7217 counters display on the LED displays 85 and 98 the stored value and not the counting value, and on and off times are continuously displayed. This could represent the inhale 87 or exhale 86, times, or other measurements. To conserve power, a liquid crystal display can be used instead of the LED displays. The FIG. 9 device could aid an anesthesiologist during an operation in a hospital.

FIG. 10 is an adaptation to provide maximum time measurement, utilizable in sleep apnea, which circuit includes or contains the electronics necessary to provide the maximum time between events. In the FIG. 10 embodiment, initially the reset switch of the counters 103 and 108 are activated by Reset 112 when it is pressed, which resets both four digit counters to zero. The standard clock 99 produces pulses every 0.1 second which by lead 113 causes the input four digit counter 103 to count. After the first count, the magnitude comparitor 104 senses that the input is greater than the output and produces a greater-than signal which enables the gate 106. This allows the next clock pulse to increase the count on both the input counter 103 and (by lead 107 to) output counter 108. This continues until the reed switch 100 closes which causes the one shot 101 to produce a single pulse. This loads the input counter 103 to zero. The clock 99 will immediately cause the input counter 103 to count, but the output counter 108 will be inhibited by the magnitude comparitor 104 via the gate. Eventually the input will exceed the output and the output will receive more clock pulses, and catch up. As soon as the longest cycle time has occurred, the output counter 108 will thereafter be prevented from counting by the magnitude comparitor 104 (by lead 105) and gate 106. The FIG. 10 circuit can count to (999.9 seconds) to an accuracy of 0.1 second. The output of the output counter 108 goes to a display driver 110 which in turn feeds a LED or a liquid crystal display 111.

In the FIG. 11 embodiment, it additionally contains the electronics which sound an alarm if repeated opening and closing of the reed switch fails to continue. The timer counter is set to the output through lead 117 to go high within about 15 seconds if it is not reset. When the reed switch 114 closes, it triggers the one shot 115 which produces a reset pulse and resets the timer counter 116 (such as a standard electronic device) to zero. The timer counter 116 tries to time out but keeps getting reset to zero. If breathing or other measured-event stops, the timer-counter 116 will timeout and the output 117 will turn on high. This will energize the switching transistor 118 used to provide the power for the transmitter 119. The transmitter 119 then goes on. This transmitter 119 could be typically any of a buzzer, an electronic horn, a radio transmitter, or a high frequency sonic transmitter such as used in some hospital warning systems.

FIG. 12 diagrammatically shows another application-/embodiment of the present inventive direction-change sensor. As a matter of background, it is noted that a good quality aircraft controller contains a handle which moves forward and backward within a bounded region. Connected to an attached pivot point or shaft is a device called a resolver. The angle of the shaft is turned into four wire electrical data (sine and cosine) by the resolver. This is sent over wires to a digital converter which transmits the data to a computer at a rate such as 16 times per second. The only information the computer gets is the angle and it does not get it instantly. Also due to noise and errors, small changes may go unnoticed for a while. If during sever maneuvering the pilot overshoots the desired setting of the handle, and then tries to correct, the computer may not get that information fast enough.

In addition, some resolver-to-digital converters may overshoot or electrically spin, especially after a sudden motion. Thus the plane could be lost.

By use of the present invention, a reed swith 124 is added to the shaft 120 (mounted in bearing 120a as diagrammatically shown in FIG. 12); the split second the handle 121 is reversed in direction, the reed swith 124 thereby immediately sends a control signal to the computer separate from resolver 125 through circuitry 126, devoid of hazardous delay. The computer (not shown, but conventional) immediately reads the signal from the resolver 125 to the digital converter and prepares to disregard this reading if it suspects a spin condition, or alternately prepares to reverse the mechanisms it controls. In addition, when the pilot has reached a desired position, he may oscillate the handle about a certaing point. The computer could see this from the direction sensor and act accordingly. Thus the direction sensor of FIG. 12 embodiment here provides a quick look-ahead-feature to thereby tell the computer what is going on and what is going to happen next.

This advance warning is useful in ships, elevators, and all types of control systems. It provides a look ahead capability and also a second signal upon which a computer can pass judgment on.

In this FIG. 13 embodiment, the sensor device and spring (and sensor case) cumulatively designated 128, is mounted on basement ceiling surface (shown-in-part) 131. The cord 129 preferably has some slack so a counterbalancing spring in the sensor casing doesn't have to travel so very far. A weighted-float 130 which floats (suspended by cord 129) is slightly heavier than the spring force; thus the weighted-float preferably rests on the floor 132. The reed switch (within the sensor 128) is set in the off position by pulling the cord tautly by slowly lowering the weighted-float to the floor. If there is a flood in the basement, the weighted-float will rise by floating on flood-waters, thereby setting-off the burglar-alarm or other alarm. A major advantage of this system is that it can be economically produced and sold for a low sales-purchase price of about two dollars, and will prevent large flood damage and losses. Additionally it obviously can be used as a sensor to start a sump pump.

Similarly, by connecting it to a door or window, it can serve as a low cost burglar alarm. The alarm circuitry can be attached to the reed switch, or an existing burglar alarm used and conventionally connected.

FIG. 14 discloses a direction sensor embodiment where the drive means (on which the slip clutch magnets ride) is an inertial mass of magnetic material such as iron. The FIG. 14 shows an inertial mass 137 of ferromagnetic material (not magnetized) located in a slid-space of chamber 136 in which it is free to move or slide alternately toward and between left or right. The chamber housing 133 has a relatively smooth surface 140 and the inertial mass has a smooth slide-surface 141. A top cover 134 and bottom cover 135 of non-magnetic material keep the inertial mass 137 inside its slide space. This device can be mounted axially inside a rocket or airplane; when the rocket or airplane accelerates, the inertial mass 137 slides in one of the directions 143a or 143b relative to the housing 133 in accord with the law of inertia, thus causing the reed switch 138 to close. As soon as the rocket or airplane quits, air friction or other retarding forces cause deceleration of the rocket or airplane and the inertial mass moves instantly in the opposite direction 143a or 143b relative to the housing 133 to thereby open the reed switch 138. This simple inexpensive device thus alternately detects the opposite changes in direction of acceleration and deceleration respectively. For three dimentional quantities, a cube (not shown) incorporates three reed switches and is excellent for spacecraft uses; the reed switch 138 has electrical leads 139a and 139b. Two magnets 137A and 137B include attached slip-disks 142a and 142b such as attached layers of nylon or Teflon(TM) material, held against the surface 141 by magnetic attraction of magnets 137A and 137B.

FIG. 15 discloses a direction sensor similar to that of FIG. 14; in FIG. 15 embodiment, the drive mechanism of inertial mass additionally has counterbalancing springs 144a and 144b biased between the inertial mass 137' and the end-wall-surfaces 145a and 145b, which act against the inertial forces.

The FIG. 15 shows an inertial mass 137' in a housing 133' with top and bottom covers 134' and 135'. In addition, the two springs act to restore the position of the mass when there is no acceleration forces present. This embodiment resembles an accelerometer, but it is not one. The difference is caused by the slip-clutch magnet and function thereof relative to the reed switch.

Assume this embodiment is attached to a rocket. As the rocket moves toward the left in direction 143b', the reed switch will close. The rocket's acceleration normally increases for a while as the engine goes to maximum thrust. This causes the inertial mass to move farther to the right relative to the housing, but movement of the slip-clutch magnets 137A' and 137B' is terminated by the window-retaining walls 147a and 147b; after maximum thrust has been reached, the springs move the inertial mass slightly back toward the illustrated central or center location. At this point of slight reverse motion the reed switch opens; while movement in direction 143a' of the inertial mass may be large, beyond the central point, the window wall surfaces 147a and 147b limit slid-travel of magnets 137a' and 137b'. Thus, this device detects when acceleration either increases or decreases. Mathematically it gives you the sign of deriative of acceleration. There is no other device in the world which produces this useful information. Thus, a transmitter could send back to earth the signal the moment that the rocket peaks out.

The combination embodiments of this patent application constitute a very useful family of inventive devices which are very similar to existing prior-art devices, except for the novel combination embodying the novel slip-clutch and the reed-switch which have been incorporated into the prior art devices with the novel results that we can now for the first time obtain the exact second (instant) that an object changes direction, the exact second that the force acting on an object changes direction, the exact second that the force acting on an object changes direction, and the exact second that the acceleration of an object either increases or decreases. This disclosed invention does "not" measure how fast an object is going, nor how much acceleration exists, a measurement that has been done by thousands of other patents. This present invention is thus unusual and unique and stands alone. Shown here in the disclosure are merely a sample of the many important and useful applications of this invention principle.

It should be noted that in FIG. 7B discussed above, element 66 is diagrammatically representative of a side view (edge-view) of a supporting disk of material that conducts magnetic flux, i.e., a magnetic type material in disk form, the same as previously-discussed disk 10.

It is within the scope of the invention to make variations and substitution of equivalents within ordinary skill of the artisan in this field.

I claim:

1. A direction sensor device comprising in combination: at least one magnet element as a first magnet having a first substantially smooth surface adapted to slip in the nature of a slip-clutch on and along an adjacent second substantially smooth surface; a movable driving mass means for imparting driving and moving force to the first magnet when the first magnet is mounted magnetically onto the movable driving mass means, said movable driving mass means having said adjacent second substantially smooth surface with said first magnet magnetically-mounted thereon; a base element separate from the stationary relative to said driving mass means and the base element including spaced-apart first and second barrier travel-limiting structures positioned a predetermined minimum distance away from one-another and on opposite sides of said first magnet, said predetermined minimum distance being larger than said first magnet's dimension as the first magnet is measured along a first linear dimension substantially parallel to said axis of travel, and said predetermined minimal distance being always smaller than said second smooth surface as measured along a second linear dimension substantially parallel to said axis of travel, the first and second barrier travel-limiting structures and the first magnet being substantially lineally-aligned along an axis of travel of the first magnet when the movable driving mass means moves in a common direction substantially parallel to said axis of travel; and a switch means for closing an electrical circut and for opening said electrical circuit responsive to alternate directions of travel of said first magnet along said axis of travel between said first and second barrier travel-limiting structures, the switch means being stationarily mounted on said base element relative to said movable driving mass means, whereby movement of the movable driving mass means causes the switch means to make or break electrical circuit of a circuit within which the switch means is integrated.

2. A direction sensor device of claim 1, in which said switch means comprises a reed switch of a type responsive to magnetic flux induction to make and break alternately connection between opposing contacts thereof, operatively positioned a predetermined first distance from said first magnet for induction activation.

3. A direction sensor device of claim 2, including a slide clutch-disk positioned between the first magnet's substantially smooth surface and the movable driving mass means said adjacent substantially smooth surface, with the slide clutch-disk mounted on at least one of said first magnet's substantially smooth surface and said adjacent substantially smooth surface adapted to slide against the remaining other thereof.

4. A direction sensor device of claim 3, in which said slide clutch-disk is permanently mounted immovably on said first magnet's substantially smooth surface.

5. A direction sensor device of claim 4, in which said slide clutch-disk comprises a layer of nylon material.

6. A direction sensor device of claim 4, in which said slide clutch-disk comprises a layer of Teflon material.

7. A direction sensor device of claim 4, including drive means for imparting sufficient force in a direction along said axis of travel to said movable driving mass element to impart movement to the movable driving mass means in at least one of alternate directions along said axis of travel.

8. A direction sensor device of claim 7, in which said drive means is adapted to impart force and consequent movement to the movable driving mass element in each of said alternate directions along said axis of travel.

9. A direction sensor device of claim 2, including a second magnet having a substantially smooth surface adapted to slip in the nature of a slip-clutch on and along said adjacent substantially smooth surface of said movable driving mass means and positioned operatively a predetermined induction second distance from said reed switch sufficiently close for induction activation by complementing induction forces of the first and second magnets.

10. A direction sensor device of claim 2, including a second magnet having a substantially smooth surface adapted to slip in the nature of a slip-clutch on and along said adjacent substantially smooth surface of said movable driving mass means, and a second reed switch moutned stationarily on said base element relative to said movable driving mass element and operatively positioned a predetermined second distance from said second magnet sufficiently close for induction activation by induction forces of the second magnet.

11. A direction sensor device of claim 2, including a closed electrical circuitry having said reed switch mounted in electrical series with a direct-current power means and in series with each of a uni-directional electric-flow means and an electromechanical counter, the uni-directional electric-flow means and the electromechanical counter being in electrical-flow parallel with one-another, adapted such that changes of direction are thereby counted on the electromechanical counter.

12. A direction sensor device of claim 2, including an electronic circuitry electrically activatable and deactivatable through said reed switch and connected in series therewith, and a pulse-producing means produceable of electrical pulses at a constant rate in consecutive series, and said electronic circuitry being operatively in electrical pulse-receiving series with said pulse-producing means, said electronic circuitry including an electrical signal inverter, and first and second transistor gates, and first and second shot-elements, and first and second counter-memory means for counting impulses from said pulse-producing means and for storing data from said first and second shot-elements, and display means for illustrating data stored in said first and second counter-memory means, said first transistor gate and said signal inverter being in electrical series with said reed switch, and said second transistor gate being in series with said signal inverter, such that said first transistor gate is disabled and said second transistor gate is enabled when said reed switch is closed, and said first transistor gate is enabled and said second transistor gate is disabled when said reed switch is open, said first shot element being in electrical series with said reed switch and feeding electrical signal to each of a store-input of said first counter-memory means and a reset-input of said second counter-memory means, and said second shot element being in electrical series with said inverter and feeding an electrical signal to each of a store-input of said secons counter-memory means and a reset-input of said first counter-memory means, and a counter impulse input terminal of said first counter-memory means being in electrical series with the gate output of said first transistor gate, and a counter impulse input terminal of said second counter-memory means being in electrical series with the gate output of said second transistor gate, and said display means being in operative series with each of said first and second counter-memory means for displaying data transmitted therefrom.

13. A direction sensor device of claim 2, including an electronic circuitry electrically activatable and deactivatable through said reed switch and connected in series therewith, and a pulse-producing means produceable of electrical pulses at a constant rate in consecutive series, said electronic circuitry being operatively in electrical pulse-receiving series with said pulse-producing means, said electronic circuitry including at least first and second multiple-digit-counters, a transistor gate, a magnitude comparitor, and a data display means, and a one-shot element, said one-shot element being in signal-receiving series with said reed switch and feeding a signal to said first multiple-digit-counter, and said pulse-producing means feeding electrical impulses to input terminals of each of said first multiple-digit-counter and said transistor, and said magnitude comparitor feeding an electrical signal to a control terminal of said transistor gate, and said transistor gate feeding an electrical signal to said second multiple-digit-counter, and each of said first and second multiple-digit-counters feeding output signals thereof to different input terminals of said magnitude comparitor, and said second multiple-digit-counter also feeding its output signal to said display means.

14. A direction sensor device of claim 2, including an electronic circuity electrically activable and deactivatable through said Reed Switch and connected in series therewith, and said electronic circuitry including a one shot element, a timer-counter means, a switching transistor, and a transmitter means in this consecutive series of receiving and feeding signals responsive to making and breaking signal from the reed switch to said one shot element.

15. A direction sensor device of claim 2, in which said movable driving mass means includes a manual handle, and including a resolver electronic means mounting said handle and said resolver electronic means being for converting pivot angle of said handle and into sine and cosine four-wire electrical signals receivable by a digital converter that would thereupon transmit angle information, an output lead of said reed switch being connected to feed signal to a computer means such that instantaneous change of direction signal is fed apart from resolver electronic means whereby a computer is given advance notice for evaluation of impending possible major movements of said handle.

16. A direction sensor device of claim 2, in which said movable driving mass means is mounted for alternate shifting movement substantially parallel to said axis of travel, being mounted on said base element between third and fourth spaced-apart barrier travel-limiting structures aligned in series with said movable driving mass means in a direction of said alternate shifting movement of the movable driving mass means.

17. A direction sensor device of claim 16, including spring means mounted between opposite ends of said movable driving mass means and said third and fourth spaced-apart barrier travel limiting structures such that the movable driving mass means is centered.

18. A direction sensor device of claim 2, including drive means for imparting sufficient force in a direction along said axis of travel to said movable driving mass means to impart movement to the movable driving mass means in at least one of alternate directions along said axis of travel, said drive means being adapted to impart force and consequent movement to the movable driving mass means in each of said alternate directions along said axis of travel.

19. A direction sensor device of claim 18, in which said drive means comprises a spring means mounted and biased between said movable driving mass means and said base element and adapted such that the spring means is returnable of the movable element from a position resulting from prior movement in at least one of said alternate directions of travel.

20. A direction sensor device of claim 19, in which said spring means is mounted and biased such that the movable driving mass means is returnable from initial prior movement direction in either of alternate directions.

21. A direction sensor device of claim 19, in which said drive means further includes a connector element attached to and extending from said movable driving mass means such that movement of said connector element causes movement of said movable element along a path substantially parallel to said axis of travel.

22. A direction sensor device of claim 19, in which said movable driving mass element is pivotally mounted on said base element and adapted for rotary movement.

23. A direction sensor device of claim 2, in which said movable driving mass element is pivotally mounted on said base element and adapted for rotary movement.

24. A direction sensor device of claim 1, in which said first barrier travel-limiting structure is an electrical contact of said switch means, and in which the switch means includes a switch electrical lead connected to said first magnet with the first magnet arranged in electrical series between said switch electrical lead adapted such that the first magnet serves as an electrical contact for said switch means an upon movement of said movable driving mass means is thereby caused to make or break said circuit by coming into contact with or moving away from contact with the first barrier travel-limiting structure.

25. A direction sensor device of claim 24, in which said second travel-limiting structure is an electrical contact of said switch means and in which the second and the first travel-limiting structures are alternate-circuit electrical leads in a flip-flop switch arrangement alternately activatable by alternate directions of movement of the first magnet when the movable driving mass means moves in alternate directions.

26. A direction sensor device of claim 1, in which said switch means is a Hall-effect transistor.

27. A direction sensor device of claim 1, in which said magnetic element comprises two spaced-apart magnets.

28. A direction sensor device of claim 1, in which said one magnetic element as measured along an axis substantially parallel to said first smooth surface and substantially parallel to said axis of travel is of a predetermined third dimension of breadth, and a range of sensitivity of movement of the one magnetic element between said first and second barrier travel-limiting structures being equal to said predetermined minimum distance minus said third dimension, and said range of sensitivity of movement being within a range between 0.001 inch and 0.020 inch.

* * * * *